(12) United States Patent
Hall et al.

(10) Patent No.: US 10,154,756 B2
(45) Date of Patent: *Dec. 18, 2018

(54) AUTOMATED KITCHEN WORKSPACE WITH ROBOT

(71) Applicants: David R. Hall, Provo, UT (US);
Andrew Priddis, Provo, UT (US);
Josephe Blanch, Provo, UT (US)

(72) Inventors: David R. Hall, Provo, UT (US);
Andrew Priddis, Provo, UT (US);
Josephe Blanch, Provo, UT (US)

(73) Assignee: Hall Labs LLC, Provo, UT (US)

( * ) Notice: Subject to any disclaimer, the term of this patent is extended or adjusted under 35 U.S.C. 154(b) by 126 days.

This patent is subject to a terminal disclaimer.

(21) Appl. No.: 15/095,591

(22) Filed: Apr. 11, 2016

(65) Prior Publication Data

US 2017/0290454 A1 Oct. 12, 2017

(51) Int. Cl.
| | |
|---|---|
| *A47J 37/08* | (2006.01) |
| *B65G 1/127* | (2006.01) |
| *F25D 23/10* | (2006.01) |
| *A23L 1/01* | (2006.01) |
| *A47J 39/00* | (2006.01) |
| *A47J 43/04* | (2006.01) |
| *A47J 37/01* | (2006.01) |
| *A23L 5/10* | (2016.01) |
| *A47J 37/06* | (2006.01) |
| *A47B 77/16* | (2006.01) |
| *A47B 77/06* | (2006.01) |
| *A47B 77/08* | (2006.01) |

(52) U.S. Cl.
CPC ............. *A47J 37/08* (2013.01); *A23L 1/0128* (2013.01); *A23L 5/10* (2016.08); *A23L 5/15* (2016.08); *A23L 5/17* (2016.08); *A47B 77/06* (2013.01); *A47B 77/08* (2013.01); *A47B 77/16* (2013.01); *A47J 37/015* (2013.01); *A47J 37/0629* (2013.01); *A47J 39/00* (2013.01); *A47J 43/04* (2013.01); *B65G 1/127* (2013.01); *F25D 23/10* (2013.01); *A23V 2002/00* (2013.01)

(58) Field of Classification Search
CPC ........ A47J 27/14; A47J 36/24; A47J 36/2483; A47J 39/00–39/025; A47J 37/00–37/1295; A47J 43/04; A23L 5/10; A23L 5/15; A23L 5/17; B65G 1/00; B65G 1/127; A23V 2002/00; F25D 23/10; A47B 77/00–77/18
USPC ......................................... 426/231–233, 523
See application file for complete search history.

(56) References Cited

U.S. PATENT DOCUMENTS

| 2,178,411 | A | * | 10/1939 | Tietz | ........................ | F24C 3/008 |
| | | | | | | 126/37 R |
| 2,180,459 | A | * | 11/1939 | Guyon | ..................... | F24C 15/18 |
| | | | | | | 126/299 R |

(Continued)

*Primary Examiner* — Drew E Becker

(57) ABSTRACT

A method of preparing meals in a computerized kitchen workspace is set forth. The computerized kitchen workspace includes one or more robots for preparing and cooking food in the kitchen workspace. Kitchen appliances may be automatically controlled according to a recipe. The one or more robots may access kitchen items necessary for meal preparation by rotating automated shelves. The meal may then be automatically prepared by the one or more robots. Automated storage shelves may be provided with electrical power for powering kitchen appliances found on the shelves.

18 Claims, 22 Drawing Sheets

(56) References Cited

U.S. PATENT DOCUMENTS

| | | | | |
|---|---|---|---|---|
| 2,328,130 | A * | 8/1943 | Guyon | F25D 23/10 29/428 |
| 2,349,541 | A * | 5/1944 | Guyon | A47B 77/08 126/299 R |
| 2,432,397 | A * | 12/1947 | Guyon | F25D 23/10 126/37 R |
| 2,449,207 | A * | 9/1948 | Guyon | A47B 77/08 34/195 |
| 2,539,613 | A * | 1/1951 | Guyon | A47B 77/08 126/37 R |
| 2,550,539 | A * | 4/1951 | Guyon | A47B 77/16 312/107 |
| 2,708,350 | A * | 5/1955 | Guyon | A47B 77/08 34/218 |
| 2,893,807 | A * | 7/1959 | Guyon | A47B 77/08 126/21 R |
| 3,094,362 | A * | 6/1963 | Murray | A47B 63/065 312/267 |
| 3,190,489 | A * | 6/1965 | Childers | G07F 11/58 221/123 |
| 3,378,324 | A * | 4/1968 | Guyon | A47B 77/02 126/37 R |
| 3,386,550 | A * | 6/1968 | Murray | G07F 9/105 194/221 |
| 3,915,529 | A * | 10/1975 | Bernier | A47B 3/10 126/37 B |
| 4,191,435 | A * | 3/1980 | Lehman | A47B 63/067 198/799 |
| 4,397,508 | A * | 8/1983 | Bohnet | A47B 77/04 126/37 R |
| 5,765,796 | A * | 6/1998 | Lanus | A47B 11/00 248/349.1 |
| 8,303,233 | B2 * | 11/2012 | Solomon | A47B 63/067 104/130.07 |
| 9,326,599 | B1 * | 5/2016 | Sowers | A47B 46/005 |
| 9,643,782 | B1 * | 5/2017 | Hall | B65G 1/127 |
| 9,645,569 | B1 * | 5/2017 | Hall | B65G 1/127 |
| 9,788,651 | B1 * | 10/2017 | Hall | A47B 51/00 |
| 2004/0173103 | A1 * | 9/2004 | Won | A47J 27/62 99/326 |
| 2005/0193901 | A1 * | 9/2005 | Buehler | A47J 44/00 99/468 |
| 2008/0003083 | A1 * | 1/2008 | Solomon | B65G 1/127 414/237 |
| 2009/0180843 | A1 * | 7/2009 | Jackson | B66F 7/00 414/12 |
| 2010/0025422 | A1 * | 2/2010 | Bjornvall et al. | G07F 9/105 221/150 HC |
| 2015/0114236 | A1 * | 4/2015 | Roy | A47J 44/00 426/231 |
| 2015/0290795 | A1 * | 10/2015 | Oleynik | G05B 19/42 700/257 |
| 2016/0045055 | A1 * | 2/2016 | Vong | A47J 44/00 99/326 |
| 2016/0081515 | A1 * | 3/2016 | Aboujassoum | A47J 36/00 426/231 |
| 2016/0338545 | A1 * | 11/2016 | Shah | A47J 44/00 |
| 2017/0188744 | A1 * | 7/2017 | Ge | A47J 27/002 |
| 2017/0290464 | A1 * | 10/2017 | Hall | A47J 37/0664 |
| 2018/0110330 | A1 * | 4/2018 | Hall | A47B 77/08 |
| 2018/0150661 | A1 * | 5/2018 | Hall | B25J 11/008 |

* cited by examiner

AUTOMATED KITCHEN WORKSPACE WITH ROBOT

BACKGROUND

Field of the Invention

This invention relates to consolidated computerized workspaces including portable computerized kitchen workspaces and modular computerized kitchen workspaces.

Background of the Invention

Computerized kitchen workspace design has traditionally focused on counter space, cabinet space, and functional work areas which are centered around the sink, stove, pantry area, refrigerator, and dishwasher with little or no thought about the overall footprint of the kitchen and the amount of user movement within the footprint. The footprint of a kitchen will in large part dictate the amount of movement a user makes within the kitchen and thus affect the speed and efficiency of work completed within the kitchen. A smaller kitchen footprint also enables kitchens to be easily manufactured in a modular form. Vertical space is often unused and if used not in an efficient manner.

BRIEF SUMMARY OF THE INVENTION

An automated kitchen workspace has been developed which may include one or more robots and a computer controlled kitchen workspace. The robot may access a sink, automated shelves, one or more food cooking devices, dishes, pots and pans, food storage, and a refrigerator. The footprint of the entire kitchen area may be between 16 and 32 square feet including all of the appliances, robot, computer system, sink, counter space, cabinet space, and food storage space. The kitchen may be prefabricated as a drop-in building module. Vertical kitchen space is maximized to organize a kitchen in a small footprint area. A consolidated computerized vertical kitchen module has been designed which allow a user and/or a robot to quickly and efficiently access kitchen items and cook and prepare food for a large group without needing a large kitchen. Multiple cooking devices can be used simultaneously. Food, dishes and kitchen tools along with kitchen appliances can be stored and used while on one or more of a plurality of vertically automated shelves. The automated shelves may contain one or more pull-out drawers. One or more ovens may be positioned in front of the plurality of shelves and may slide in a horizontal or vertical direction. Additional ovens may be stored on and used while in a hidden location within a plurality of vertically automated shelves. Other kitchen appliances may also be used while in a hidden location on the plurality of vertically automated shelves. A kitchen computer/controller may be connected to the Internet and suggest cooking plans and automatically configure a consolidated computerized kitchen to operate in an efficient manner by preheating an oven and dictating audio and/or video to a user of the kitchen. The controller may also automatically locate and rotate the automated shelves to a proper position based on a user step within a recipe.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, may be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings.

Figure 1:
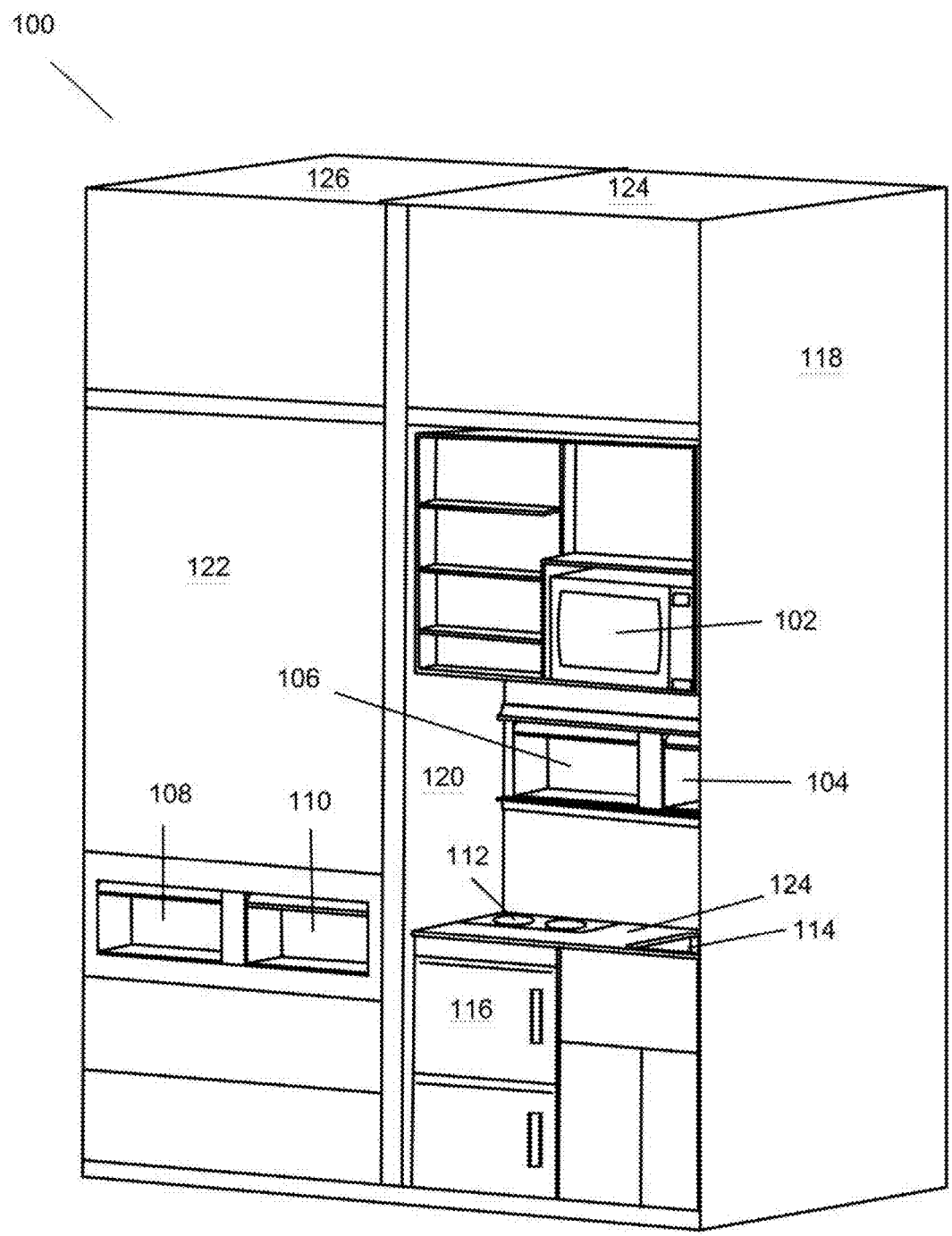
FIG. 1 is a perspective view of an embodiment of a consolidated computerized kitchen in accordance with the invention.
Figure 2:
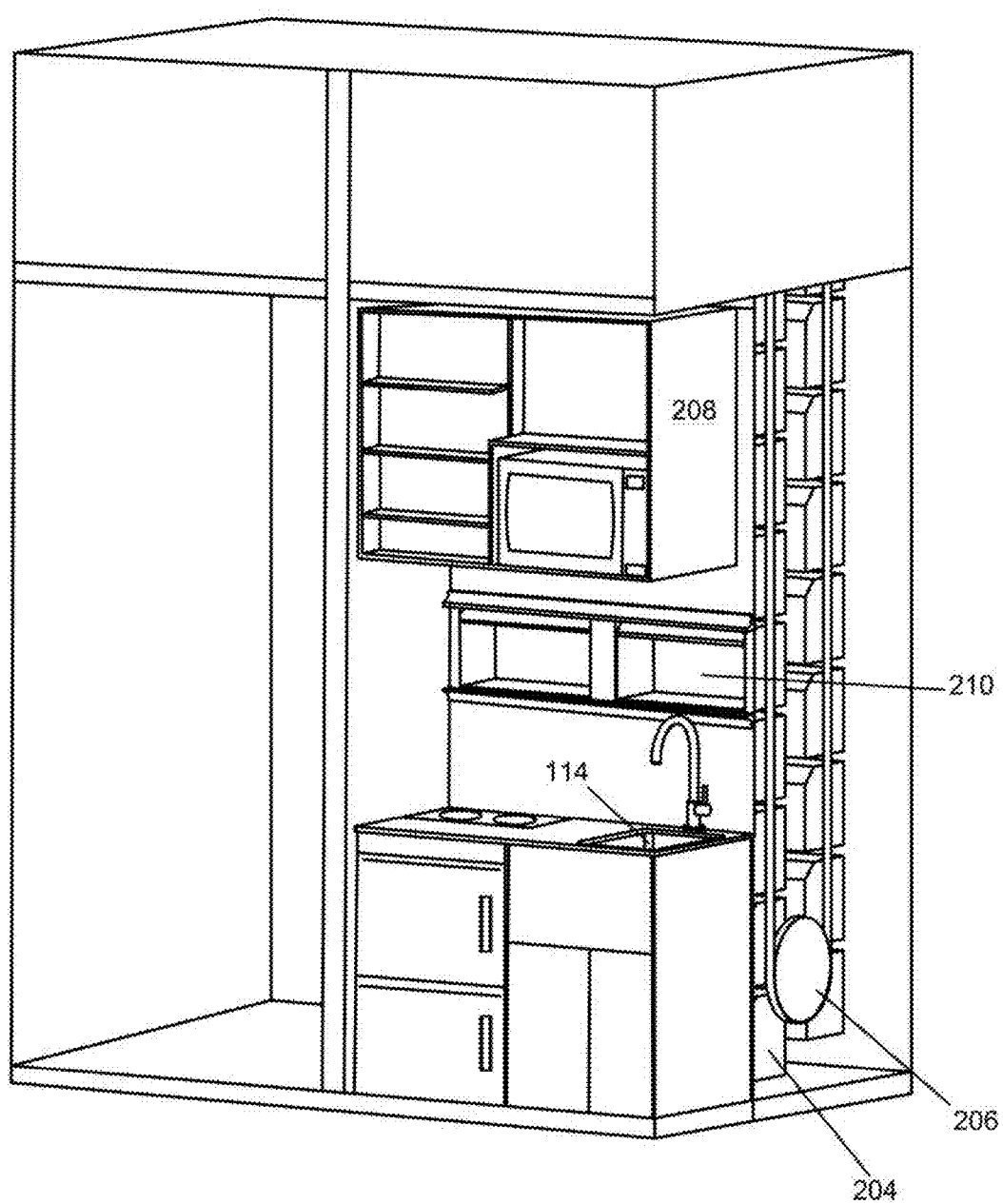
FIG. 2 is a perspective view of an embodiment of a consolidated computerized kitchen in accordance with the invention with a side wall removed showing a plurality of automated shelves.

Referring to FIGS. 1 and 2, a consolidated computerized kitchen 100 is shown. The kitchen may comprise two vertical modules 124 and optional module 126. Vertical module 124 or optional vertical module 126 may have footprint dimensions of approximately between 3 to 5 feet on each side, meaning the width and depth of each of the modules. Optional vertical module 126 may include a robot and computer system (shown in FIG. 22). The inside dimensions of each vertical module may be approximately 4 feet between walls 118 and 120; and between 122 and 120. The height of each module may be between 6 feet and 30 feet depending on the storage capacity desired and vertical space limitations. The overall footprint area of each of the vertical modules may be between 16 to 20 square feet depending on the thickness of the walls surrounding each vertical module. The consolidated computerized kitchen 100 may be constructed and used without optional vertical module 126.

A plurality of automated shelves 106, or 104, or 108 or 110 may be configured to rotate in a vertical manner allowing storage of kitchen items above and behind the sink 114, cooktop 112, refrigerator 116 and food cooking device 102.

Figures 15A, 15B:
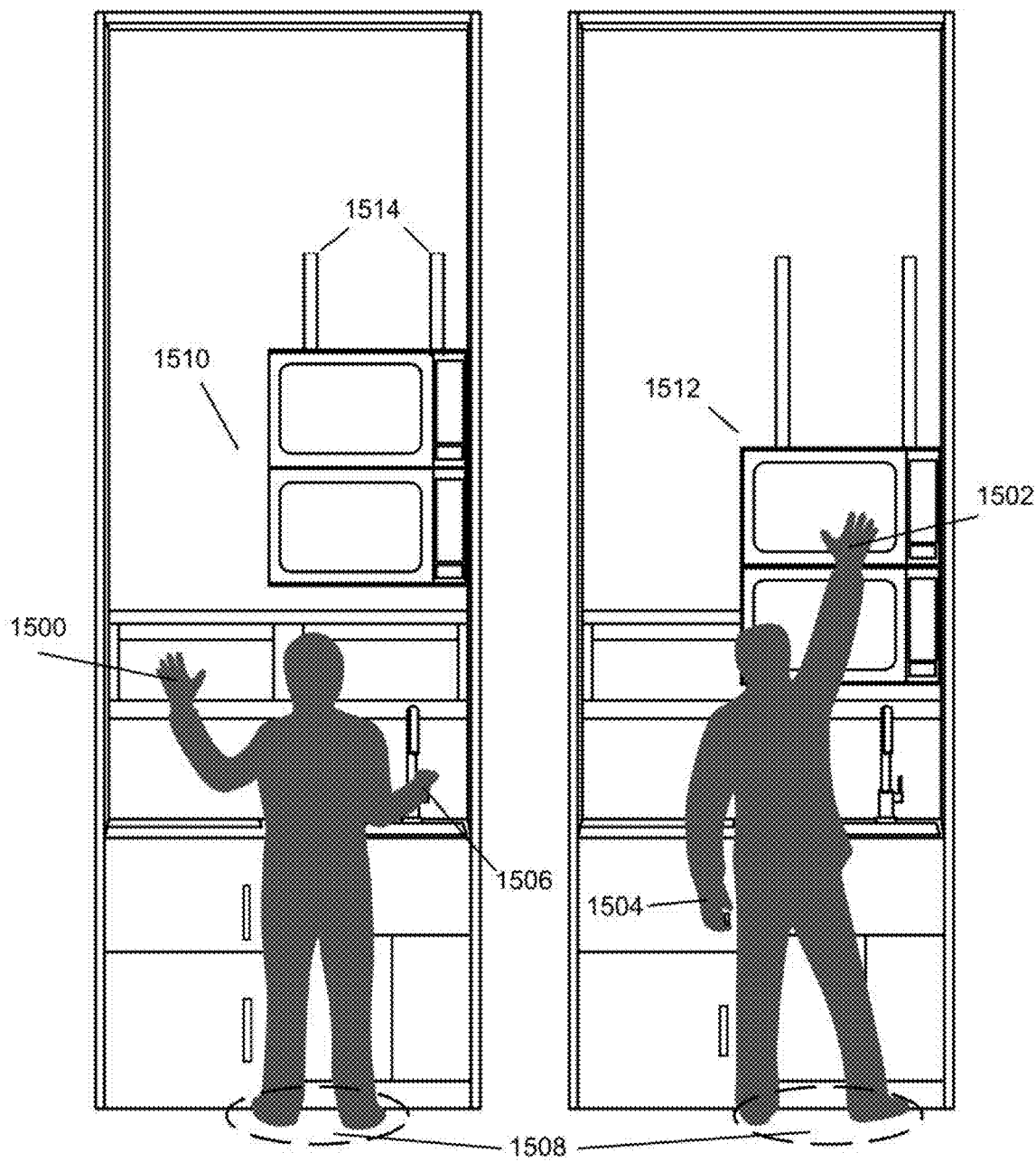
FIGS. 15a and 15b are front views of users in front of consolidated computerized kitchens in accordance with embodiments of the invention.

Food cooking device 102 may by a microwave oven, a convection oven, a toaster oven, a standard cooking oven, or a combination thereof. Food cooking device 102 may also have one or more additional food cooking devices stacked on top (shown in FIGS. 15 and 16). Cooktop unit 112 may be located in countertop 124 and positioned below automated shelves 106 and 104. A user may be able to rotate automated shelves 106 and 104 by electrically commanding movement from a user device such as a phone, iPad, iPod, or laptop computer A user may obtain cooking utensils, pots, pans, food, cleaners, or any other supplies need in a kitchen by rotating automated shelves 106 and 104. Refrigerator 116 may be located below counter top 124 and be accessible to a user while the user is standing in front of the sink. A user may be able to access the sink, the refrigerator, the cooktop, and one or more cooking devices 102 while standing in a fixed position as shown in FIGS. 15a and 15b.

In FIG. 2, automated shelf 204 is hidden behind sink 114 and may be rotated to access point 210 by means of drive pulley 206. Automated shelf 204 may have an appliance such as a microwave, mixer, blender, etc., which is in used while hidden from sight and sound of a user. Sliding oven housing 208 is shown having one oven with space for an additional oven above. The oven housing 208 may slide vertically or horizontally as desired by a user.

Figure 3:
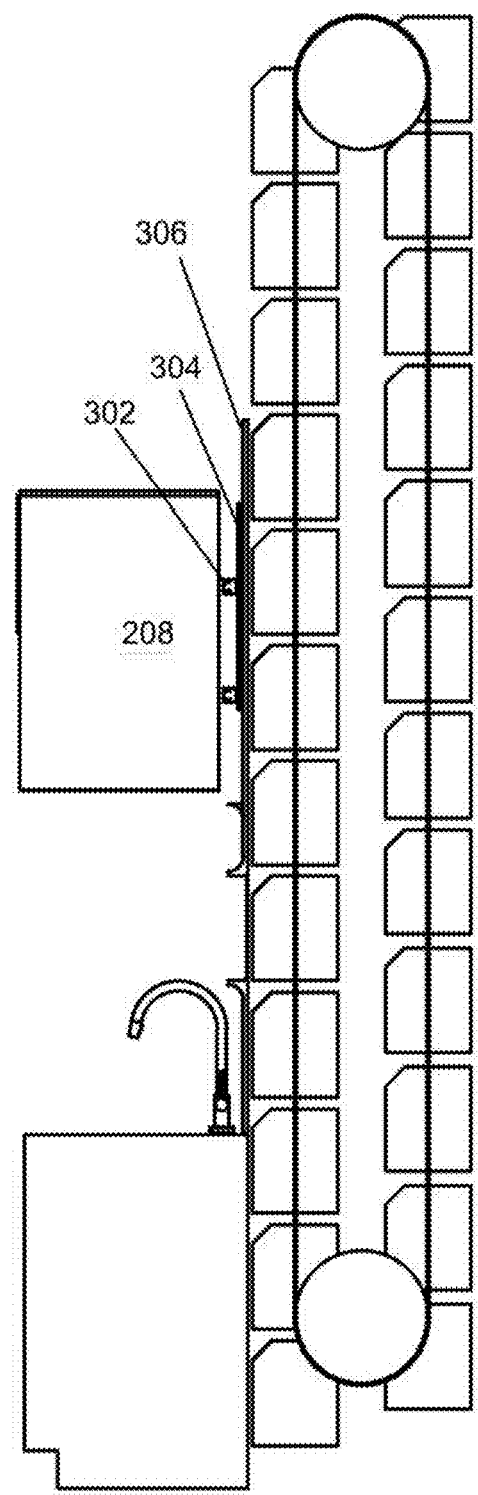
FIG. 3 is a side view of the consolidated computerized kitchen of FIG. 1, showing a plurality of automated shelves.

FIG. 3, shows oven housing 208 with horizontal sliding mounts 302 and vertical sliding mounts 304 which enable oven housing 208 to be fixed to wall 306 and slide horizontally or vertically.

Figure 4:
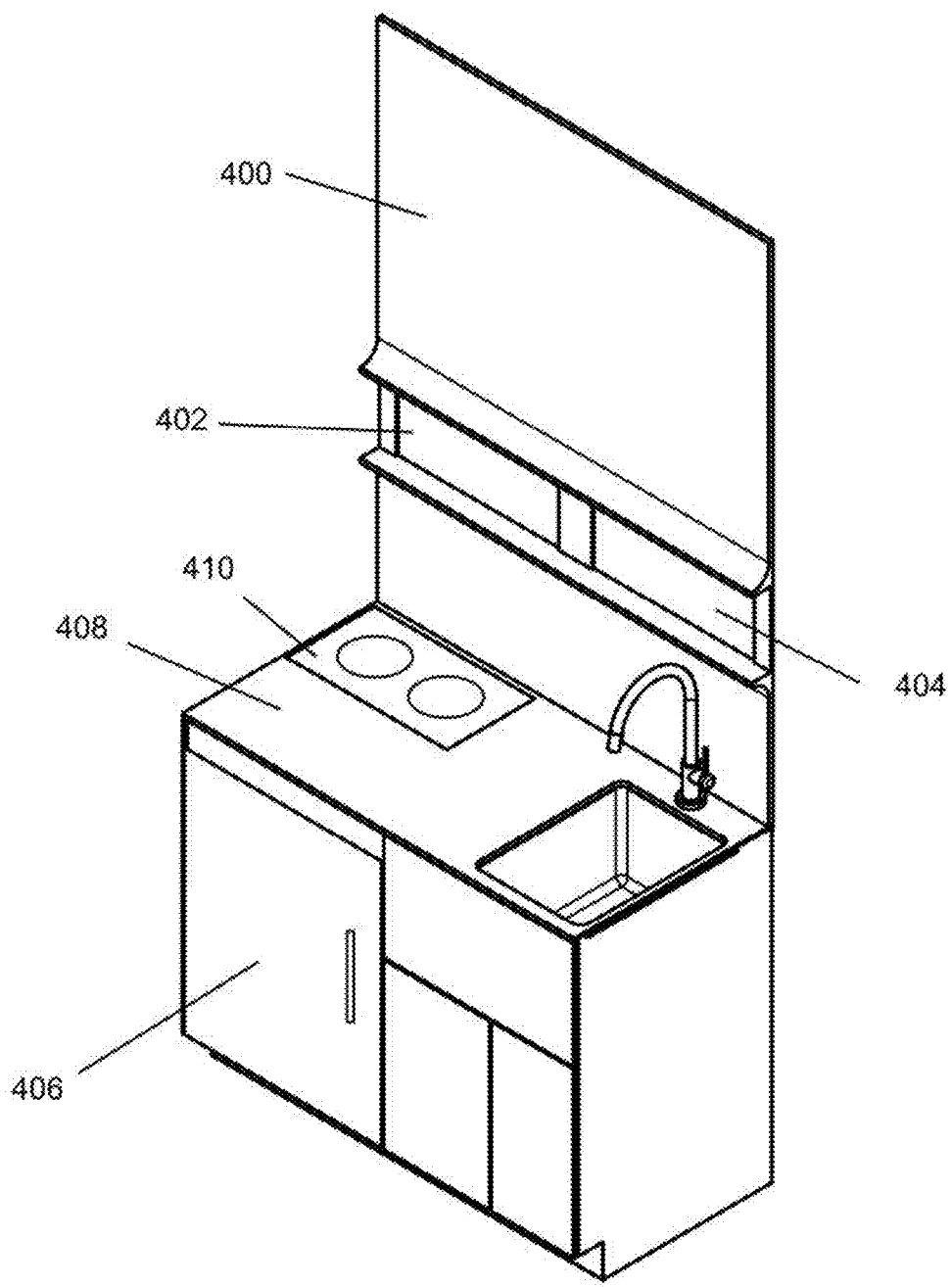
FIG. 4 is a perspective view of a portion of a consolidated computerized kitchen of FIGS. 1 and 2.

FIG. 4 shows a perspective view of a front portion of vertical kitchen module similar to that of FIG. 2. Access points 402 and 404 may be formed in the face of wall 400. User access pints 402 and 404 may be for accessing kitchen items in each plurality of vertically stacked automated shelves. Countertop 408 may provide a user work surface for cooking, cleaning, and preparing food. Refrigerator 406 may be located under countertop 408 and in front of the automated shelves. Cooktop 410 may be inset in countertop 408 and be located in front of the automated shelves.

Figure 5:
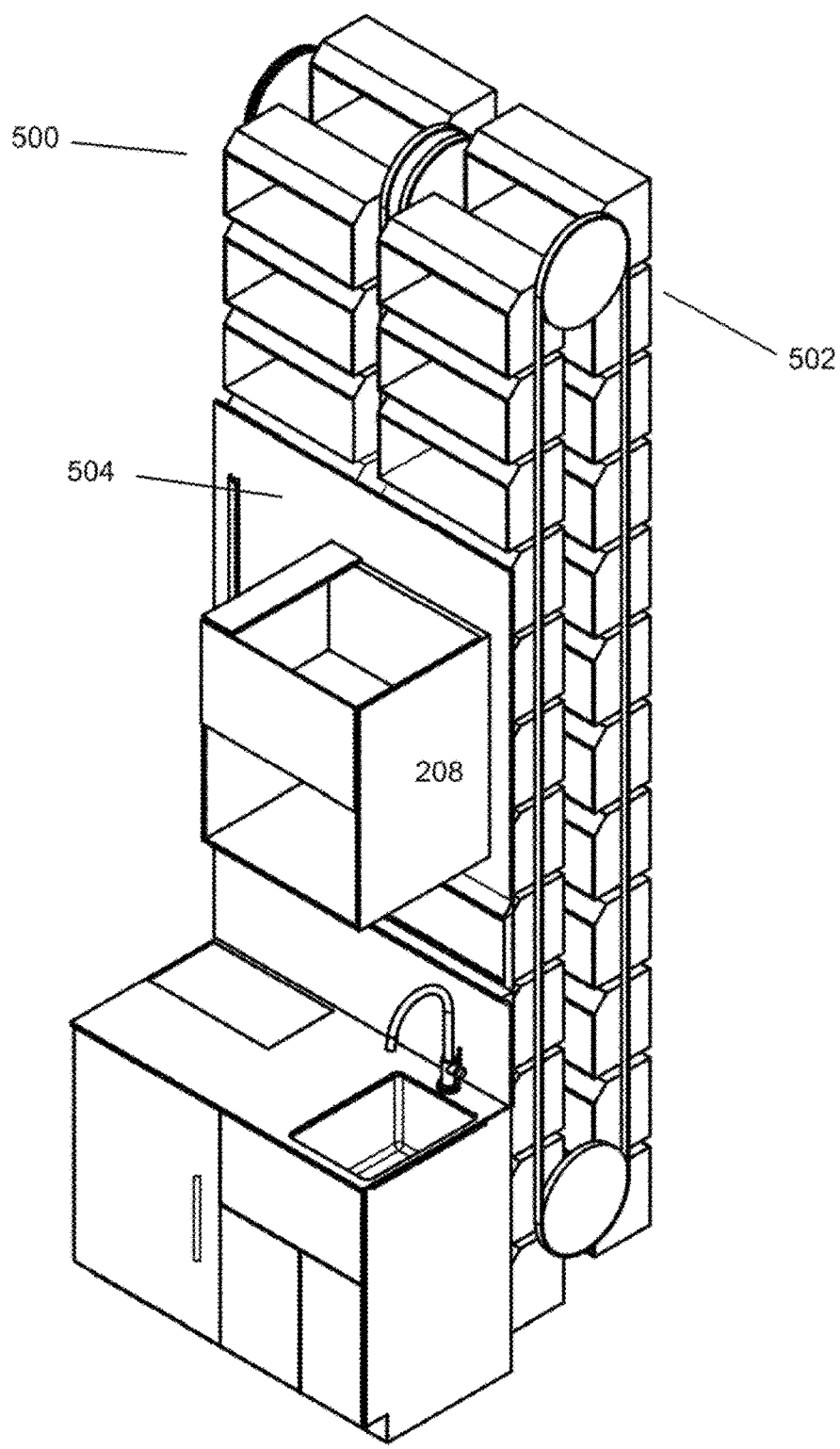
FIG. 5 is a perspective view of an embodiment of a consolidated computerized kitchen in accordance with the invention with the side walls removed showing two sets of a plurality of automated shelves.

In FIG. 5, a single vertical kitchen module is shown without any walls. A first plurality of vertically stacked automated shelves 502 may be located adjacent to a second plurality of vertically stacked automated shelves 500. The set of automated shelves 500 and 502 may be a height of between 6 feet and 30 feet depending on the amount of storage needed and space limitations. The oven housing 208 may be positioned in front of the first plurality of vertically stacked automated shelves 502 or in front of the second plurality of vertically stacked automated shelves 500. The oven housing 208 may contain an open top or air vents in the top, side, or rear for providing ventilation. Oven housing 208 may be positioned by a user by physically moving the housing in a vertical and/or horizontal position while staying attached to wall 504. Oven housing 208 may be raised or lowered to allow a user to access one or more ovens contained in the housing 208.

Figure 6:
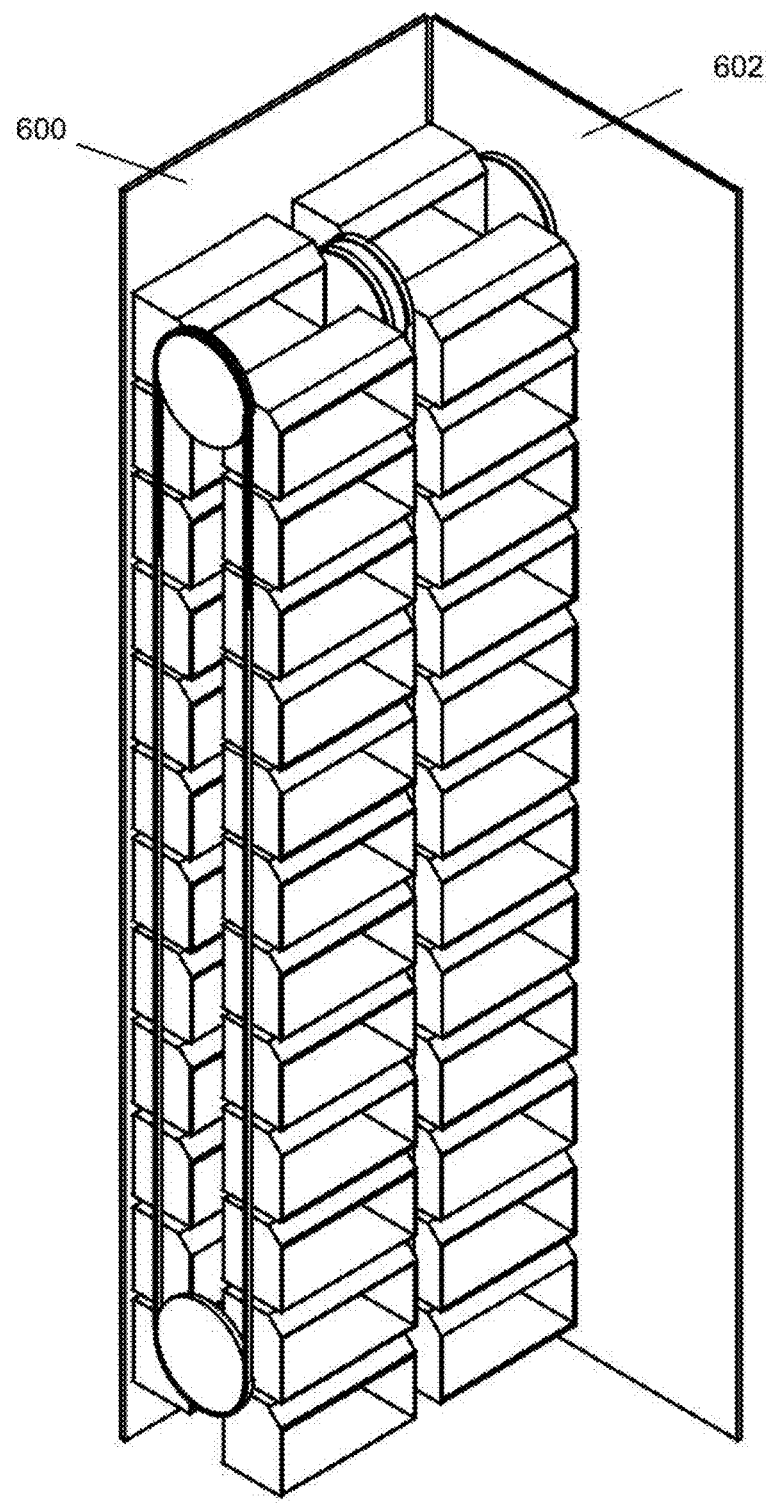
FIG. 6 is a perspective view of an embodiment of two sets of a plurality of automated shelves with two side walls.

FIG. 6, shows back wall 600 and sidewall 602 partially surrounding two sets of vertically stacked shelves. All four sides and the top and bottom of the vertically stacked shelves may be covered or partially covered or surrounded with walls. The walls may have sound damping materials such as mass loaded vinyl which protect users from appliances which may be in use on the vertically stacked shelves. For instance, a user may start a blender and then rotate the vertically stacked shelves so they don't hear the blender noise.

Figure 7:
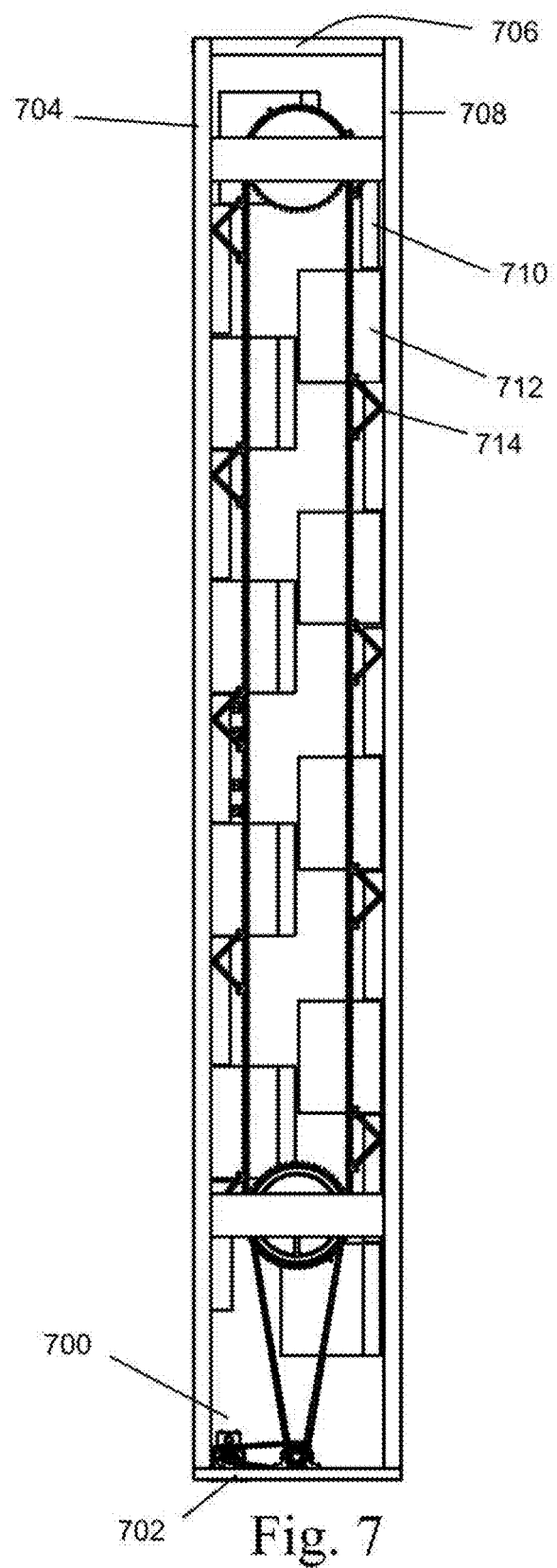
FIG. 7 is a side view of an embodiment of a plurality of automated shelves in accordance with the invention.

FIG. 7 is a side view of a plurality of vertically stacked automated shelves. Two distinct sizes of shelves are positioned alternately along the vertical stack. Shelf 712 is a deep shelf and is found in every other position along the vertical stack. Shelf 710 is a shallow shelf that is found in between deeper shelves 712. Staggering shallow and deep shelves allows the shelves to rotated around the end sections without binding or hitting each other. A drive system 700 provides motion for the automated shelves. Automated shelves 712 and 710 are connected to the drive system 700 by means of a linking member 714. Drive system 700 may be connected to a power source and to a controller (not shown). The controller may provide a motor control signal and a wireless control signal for controlling the motor. User controls may include a wired connection to the controller or a wireless connection to a wireless user device. Linking member 714 joins a drive chain to the automated shelves and provides a pivoting action for each of the shelves. Frame members 706, 704, 708, and 702 may provide support for the automated shelves and for walls that surround the automated shelves.

Figure 8:
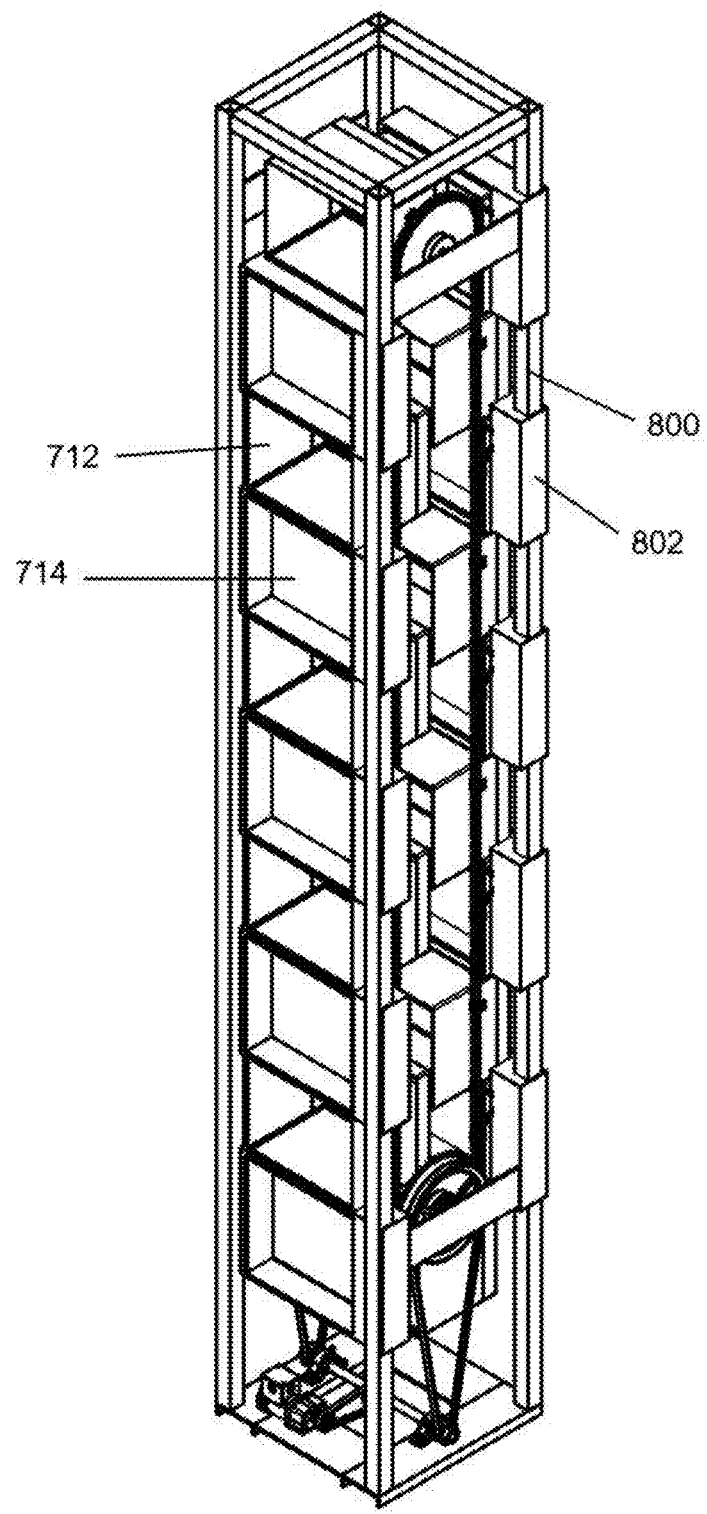
FIG. 8 is a perspective view of an embodiment of a plurality of automated shelves in accordance with the invention.

FIG. 8 is similar to FIG. 7 but has a different method of connecting shelves 712 and 714 to the drive system. Guide member 802 connects shelves 712 and 714 to each other and to the drive system. Guide members 802 are formed along a guide track 800 for securely holding and positioning each automated shelf as it rotates around in a circle.

Figure 9:
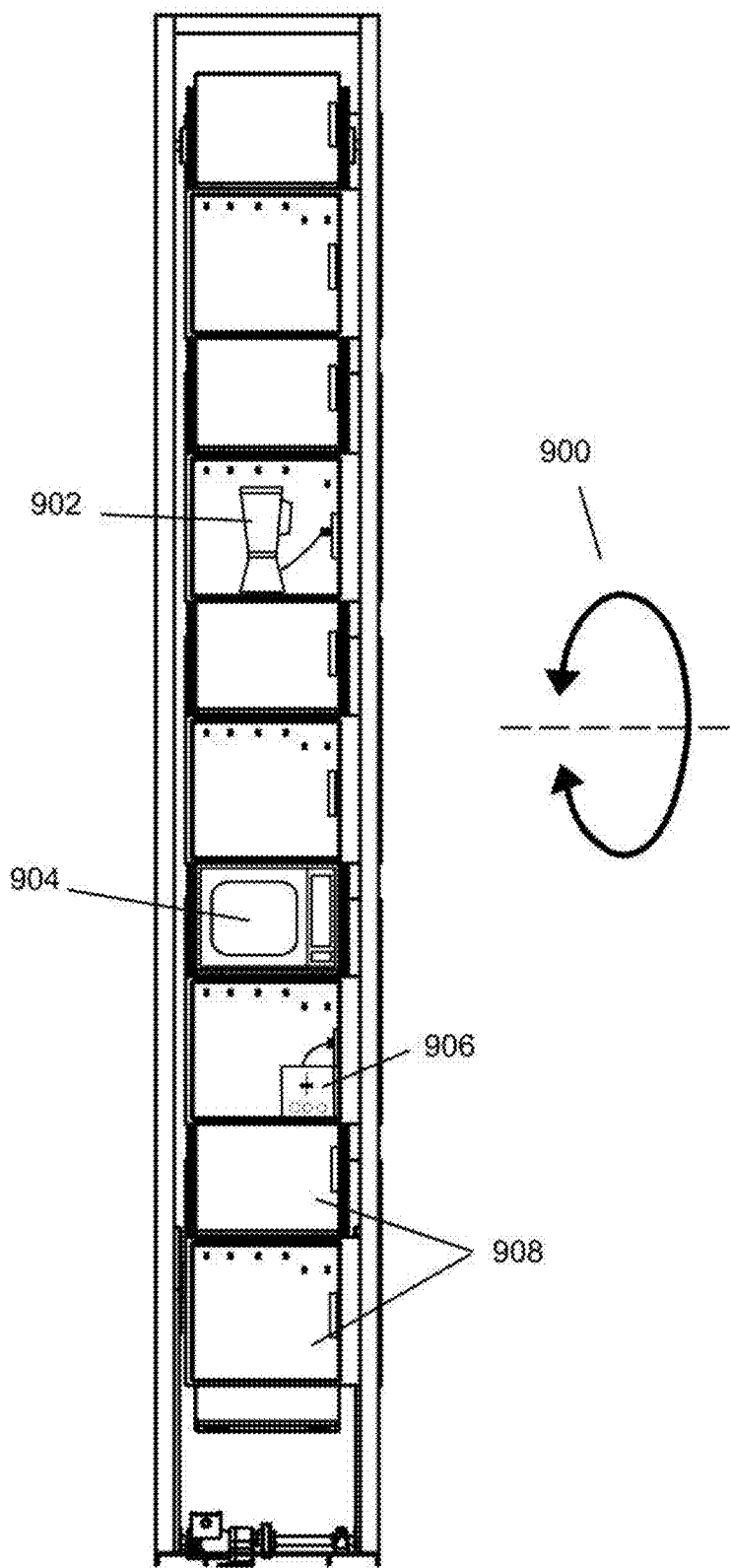
FIG. 9 is a front view of an embodiment of a plurality of automated shelves with appliances on some of the shelves in accordance with the invention.

FIG. 9 shows a front view of a plurality of automated shelves rotating 900 in a circle. Blender 900 is contained on one of the automated shelves and is plugged in to electrical power provided within the shelf. An additional oven 904 is also found on one of the automated shelves. Toaster 906 is also found on one of the automated shelves. Blender 900, oven 904, and toaster 906 may all be in operation or in use while the automated shelves are moving. Additional appliances 908 may be dishwashers, refrigerators, freezers, can openers, crockpots, etc. Any number of a single appliance may be positioned on the plurality of automated shelves. For instance, a user of consolidated computerized kitchen 100 may desire to make food for a large group. The user may access 4 additional microwave ovens located on the plurality of automated shelves and simultaneously cook food in each microwave while making toast in a toaster on another shelf and wash dishes in a dishwasher on another shelf without moving out of a single fixed standing position 1508. The user may access a phone application which tracks and controls inventory on the shelves. Food that is on the plurality of automated shelves may be kept in an online record and recipes may be automatically presented to a user of the consolidated computerized kitchen when the phone application is accessed. The automated shelves may automatically rotate to a user access position when a food item is finished cooking.

Figure 10:
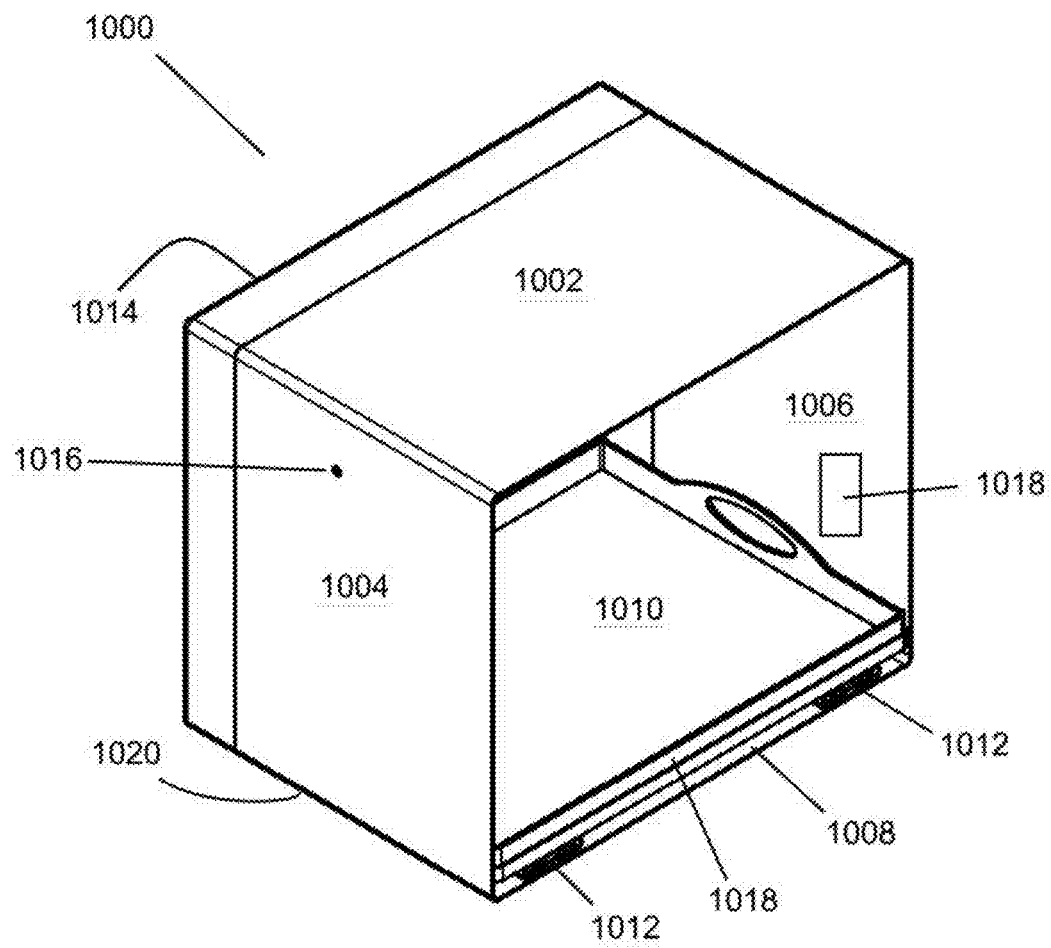
FIG. 10 is a perspective view of a large shelf of a plurality of automated shelves in accordance with an embodiment of the invention.

FIG. 10 is a perspective view of a deep automated shelf 1000. Deep box 1000 may have a pivot point 1016 for interfacing with the drive system and linking member 714. Deep shelf 1000 may have an electrical outlet for supplying electrical power to the shelf 1000 Deep shelf 1000 may be closed on five sides with walls 1014, 1016, 1006, 1002 and 1020 with a front side open. A front open side may serve as a user access when deep shelf 1000 is at a user access point 402 or 404. Tray 1010 may slide or lift out of deep shelf 1000 when a user wants to access contents of deep shelf 1000. Slide members 1012 may serve as a liner slide allowing tray 1010 to easily be removed from deep shelf 1000.

Figure 11:
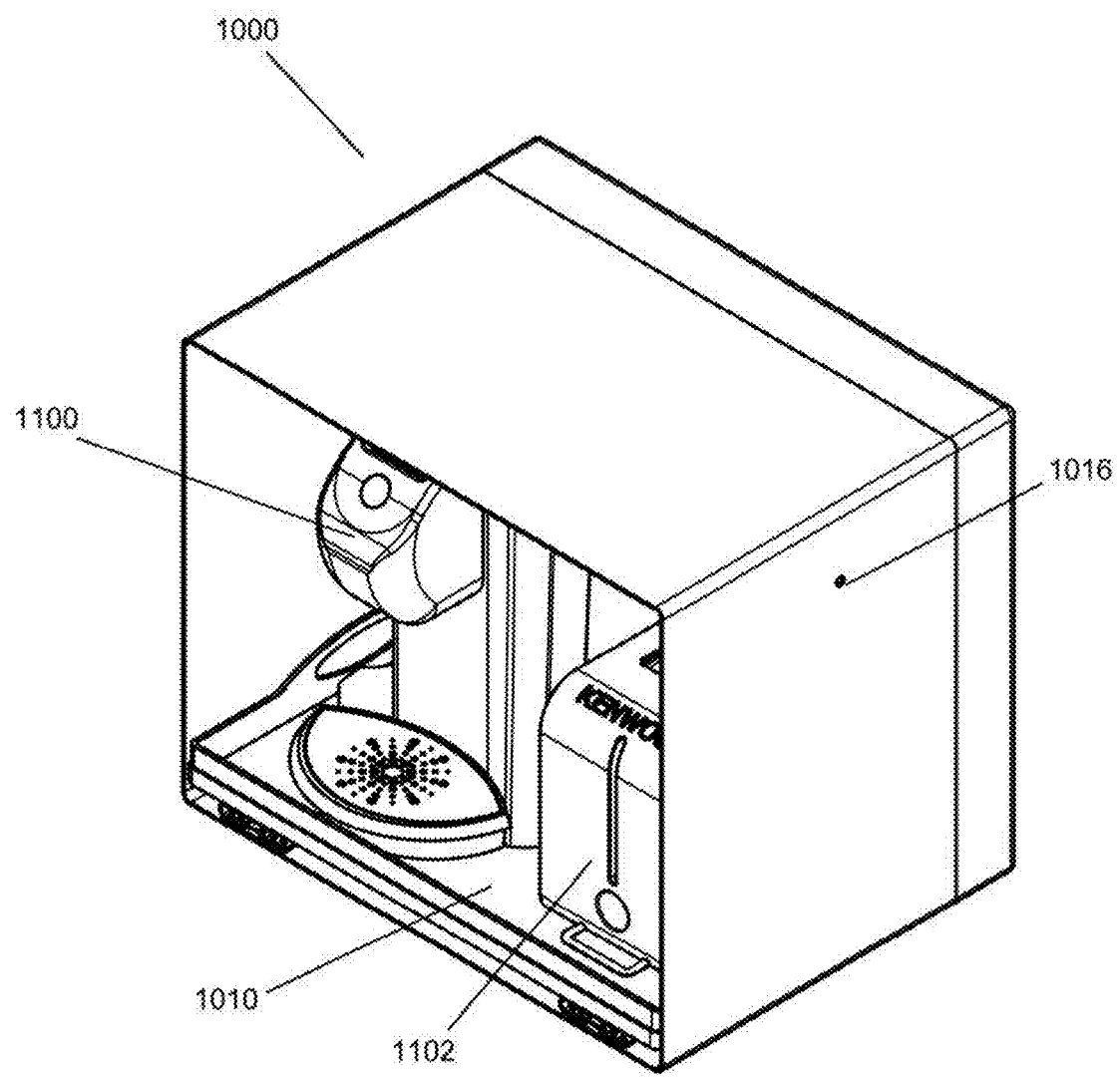
FIG. 11 is a perspective view of a large shelf of a plurality of automated shelves containing appliances in accordance with an embodiment of the invention.

FIG. 11 is a perspective view of deep shelf 1000 of FIG. 10 with appliances inside. Appliances 1100 and 1102 may be removed for use or used in place and even used when in a hidden location along the vertically stacked automated shelves.

Figure 12:
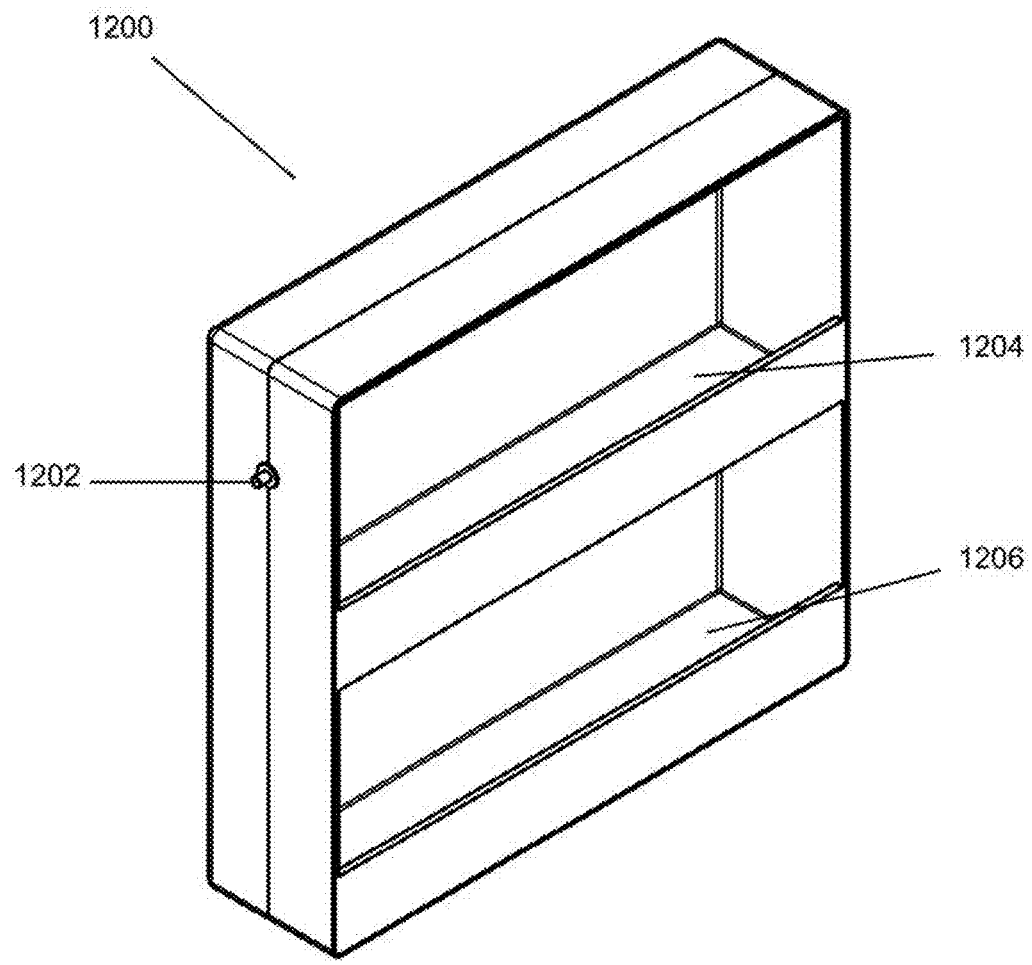
FIG. 12 is a perspective view of a small shelf of a plurality of automated shelves in accordance with an embodiment of the invention.
Figure 13:
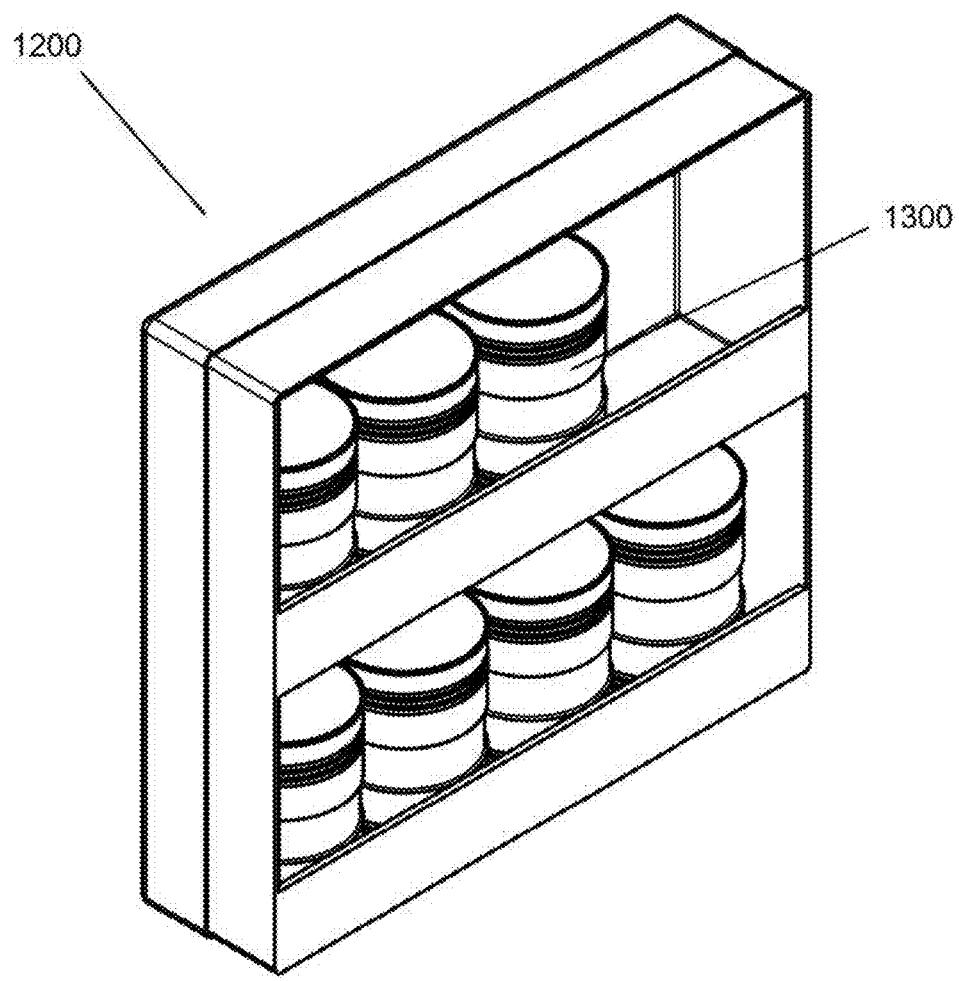
FIG. 13 is a perspective view of a small shelf of a plurality of automated shelves containing items in accordance with an embodiment of the invention.

FIG. 12 is a perspective view of a narrow shelf 1200 also shown as shelf 710 of FIG. 7. This narrow shelf may have a pivot point 1202 and this pivot point may be used to connect shelf 1200 with a drive system. Narrow shelf 1200 may contain multiple item positions 1204 and 1206 for storing and organizing kitchen items. Such items might include canned food, spices, bulk food items, and other kitchen cooking supplies and tools. FIG. 13 shows narrow shelf 1200 with kitchen items 1300 in multiple item positons.

Figure 14:
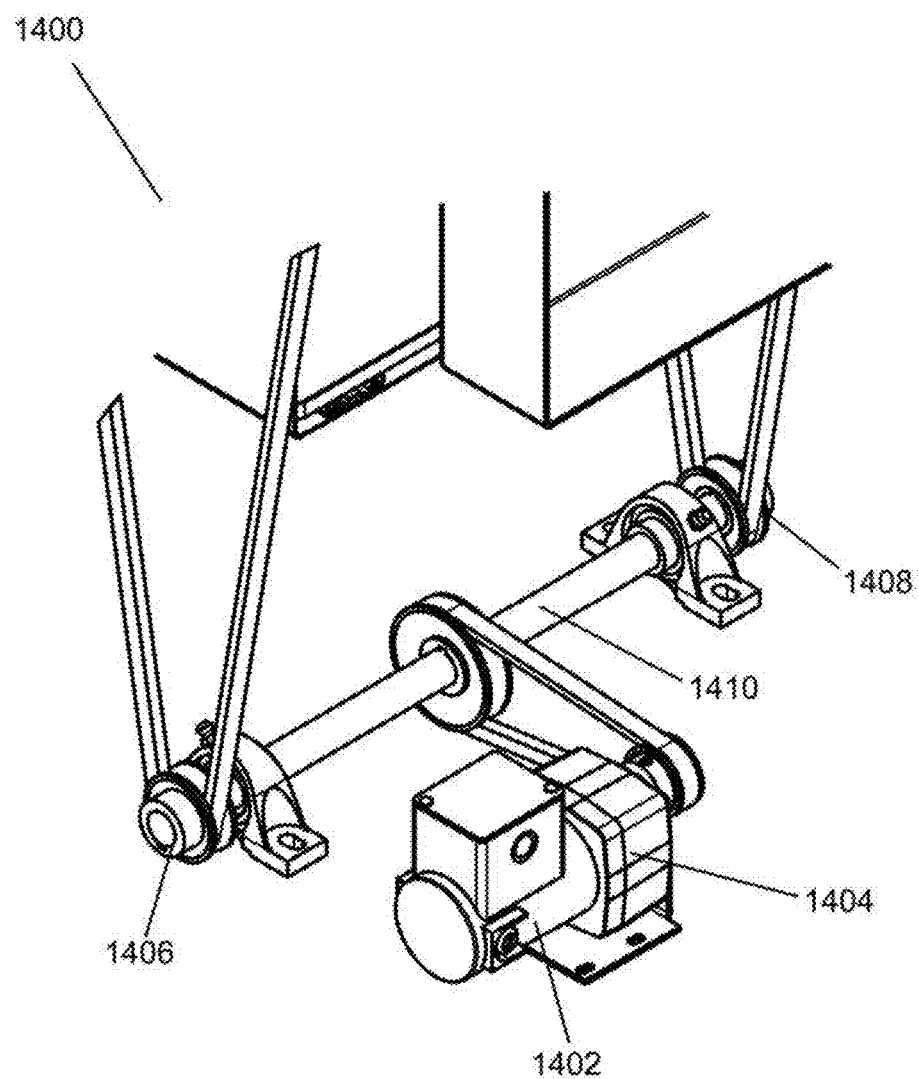
FIG. 14 is a perspective view of a drive system of an embodiment of a plurality of automated shelves in accordance with the invention.

FIG. 14 is a perspective view of a drive system that may be employed in connection with moving a plurality of vertical automated shelves. Drive system 1400 may include a motor 1402, a gearbox, 1404, a drive shaft 1410, and drive portions 1408 and 1406. Motor 1402 may drive portions 1408 and 1406 to rotate one or more of a plurality of vertically stacked automated shelves. The shelves may have complementary items that arrive at a user access location. For instance, one side of an automated shelf 106 may contain measuring cups and the other side 104 may contain items commonly used with measuring cups such as flour, oil, sugar, oats, etc.

FIGS. 15*a* and 15*b* show users standing in a fixed location in front of two different vertical kitchen modules. One user has their left hand accessing content in an automated shelf 1500 while the other hand is a using the sink 1506. Ovens 1510 are in an upper position while ovens 1512 are in a lower position. Another user is using their right hand 1502 to access an upper oven which has been pulled down in front of one set of vertically stacked automated shelves while the other hand is accessing refrigerator door 1504. Both users are able to access both pluralities of vertically stacked automated shelves while also accessing multiple cooking devices, a sink, and a refrigerator while standing in a fixed position 1508. The users can prepare food and cook for a large group while standing in the same location. All of the food, dishes, tools and appliances are at the disposal of the users without moving out of a fixed standing position.

Figure 16A:
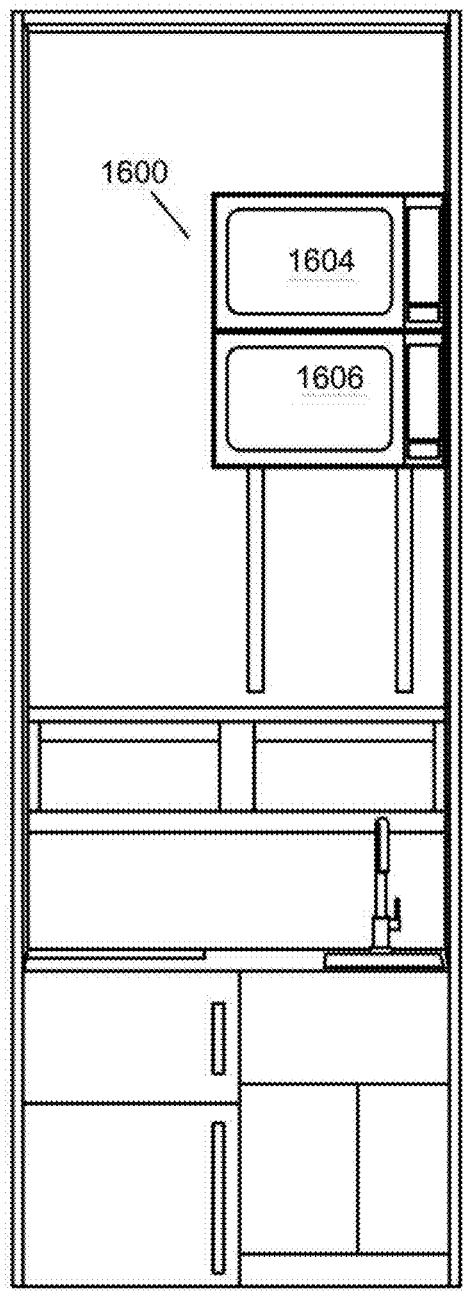
FIGS. 16a and 16b are front views of consolidated computerized kitchens in accordance with embodiments of the invention.
Figure 16B:
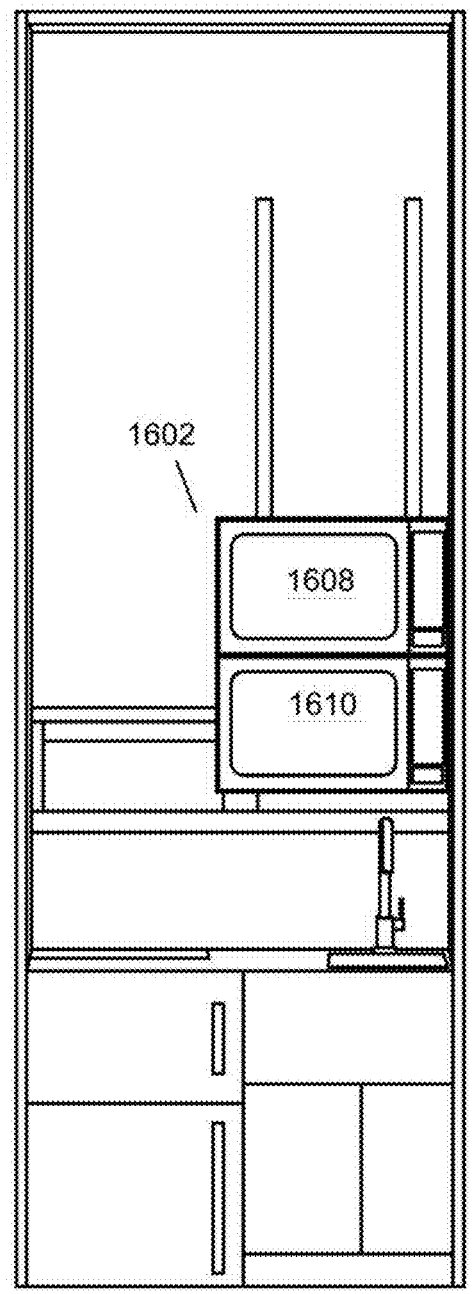

FIGS. 16*a* and 16*b* are similar to FIGS. 15*a* and 15*b* except the users are removed and oven 1600 is in a higher position. This higher position of oven 1600 might be necessary when the oven is making noise or is radiating heat and the user does not want to be close to the oven. FIGS. 16*a* and 16*b* show one or more food cooking devices attached to a movable fixture above the sink. The one or more food cooking devices are operationally functional while moving the one or more food cooking devices within the computerized kitchen workspace. Both of the food cooking devices shown may be cooking food while being moved by a user.

Figure 17:
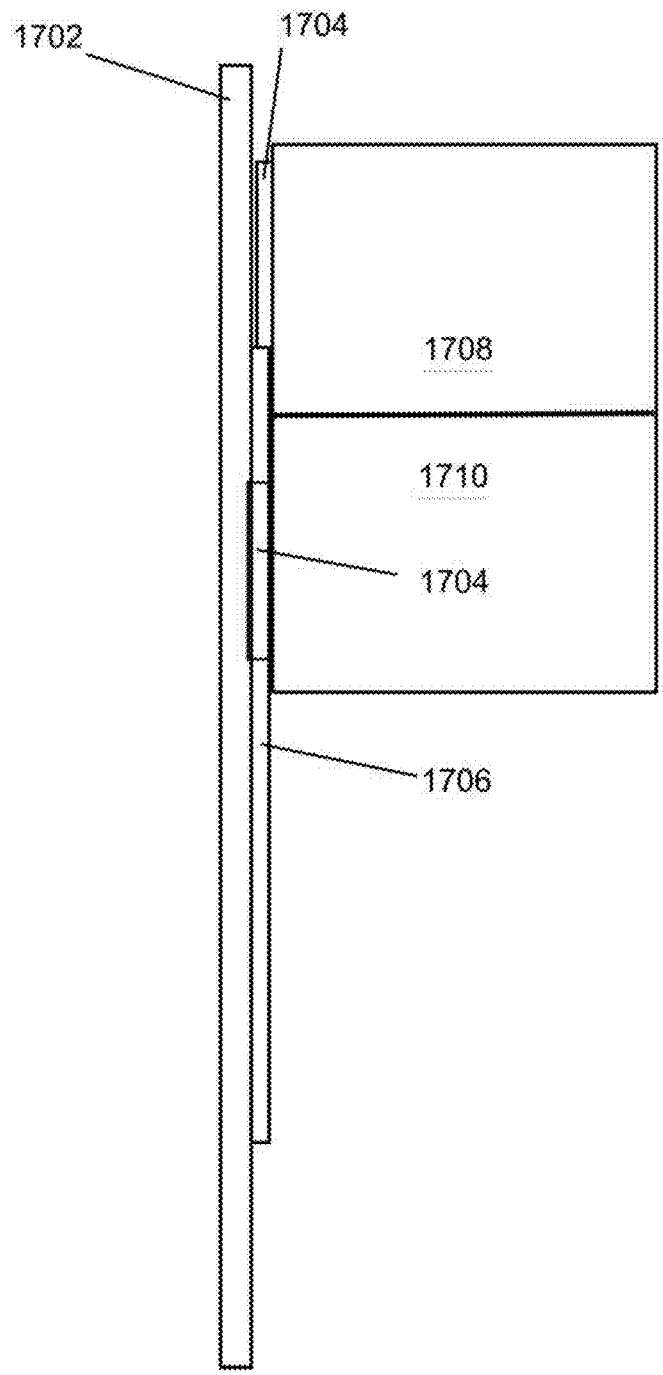
FIG. 17 is a side view of sliding ovens in accordance with an embodiment of the invention.

FIG. 17 shows a side view of two ovens (1708 and 1710) stacked on top of each other with moveable mounting brackets 1704 connected to each oven and fixed mounting bracket portions 1706 connected to wall 1702.

Figure 18:
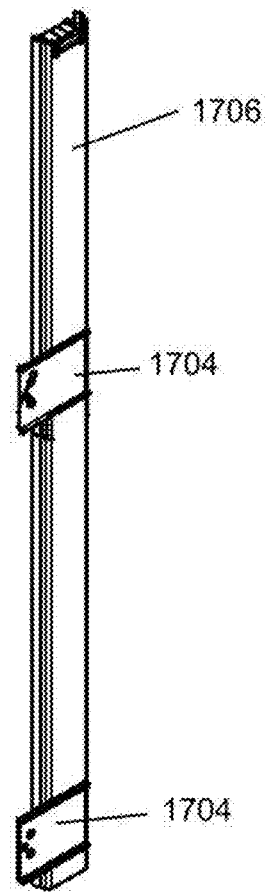
FIG. 18 is a perspective view of a sliding mechanism in accordance with an embodiment of the invention.

FIG. 18 is a perspective view of mounting brackets 1704 and 1706.

Figure 19:
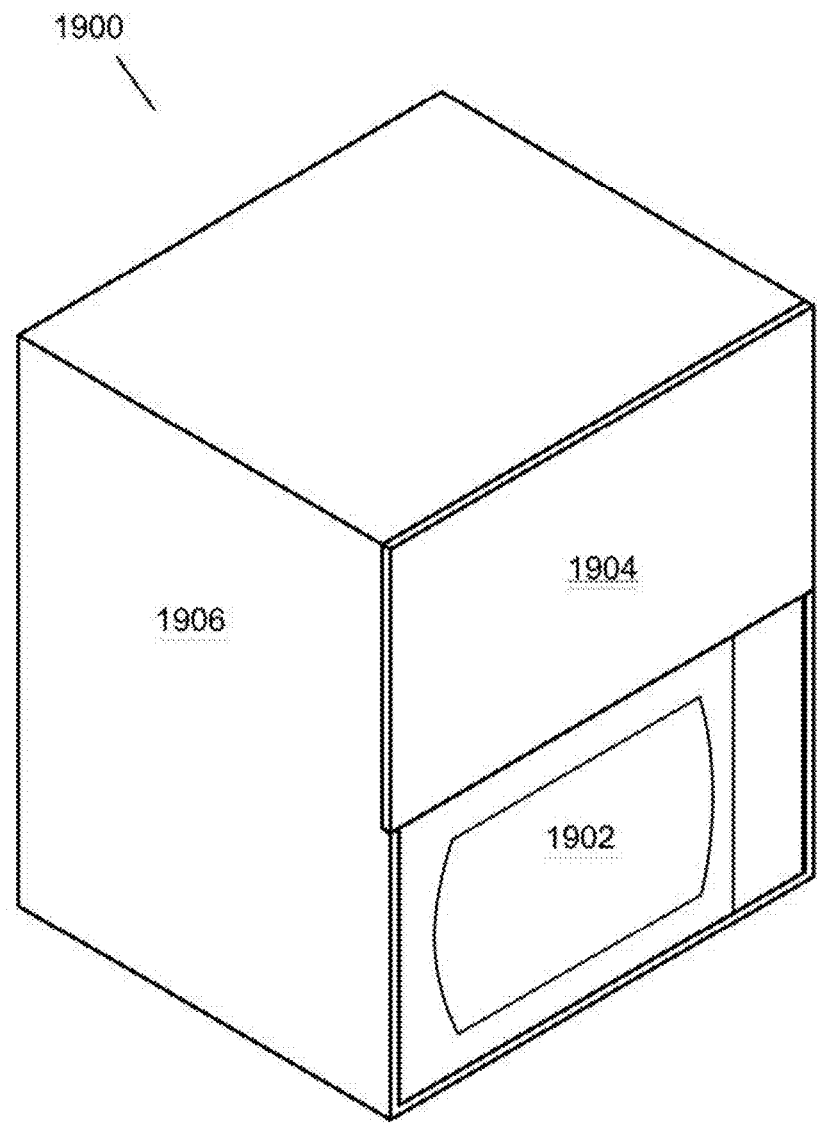
FIG. 19 is a perspective view of a housing for one or more sliding ovens.
Figure 20:
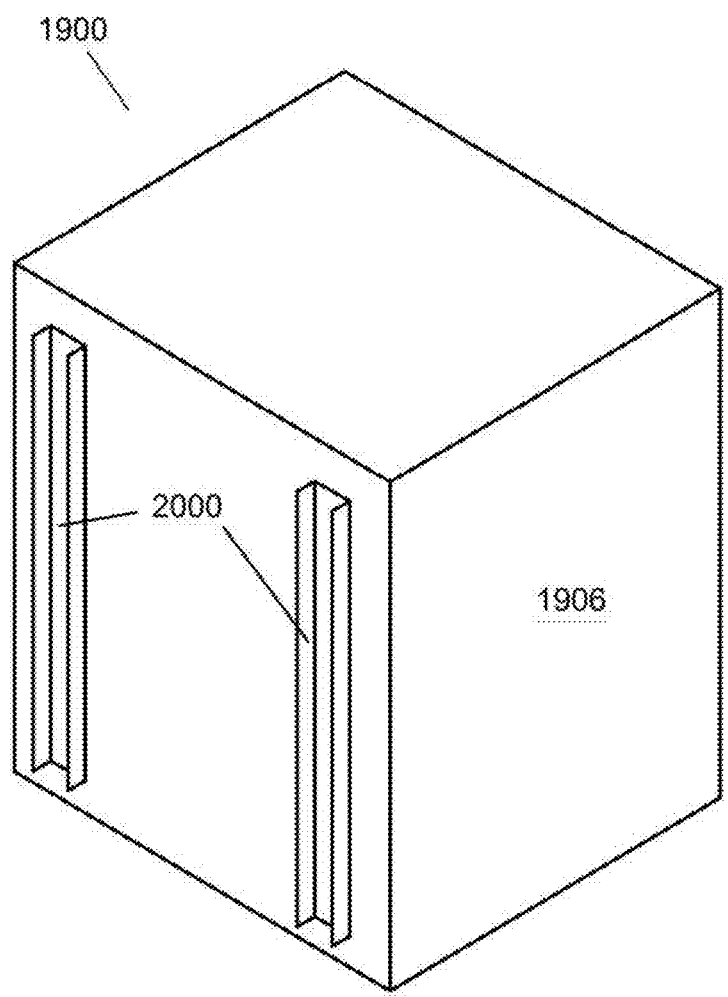
FIG. 20 is a perspective view of a rear portion of a housing for one or more sliding ovens in accordance with an embodiment of the invention.

FIG. 19 is a perspective view of oven housing 1900. This oven housing may be used to hold one or more ovens 1902. Alternatively, one or more ovens may be mounted to each other and the external frame of the ovens may be used to mount moveable brackets onto. The ovens may include microwave ovens, toaster ovens, convection ovens, standard ovens, or any combination thereof. The housing may have moveable brackets 2000 mounted to a backside of the oven housing 1900, as shown in FIG. 20. The housing may be used at least in part for storage of kitchen items in addition to ovens as is shown in FIG. 2 at 208.

Figure 21:
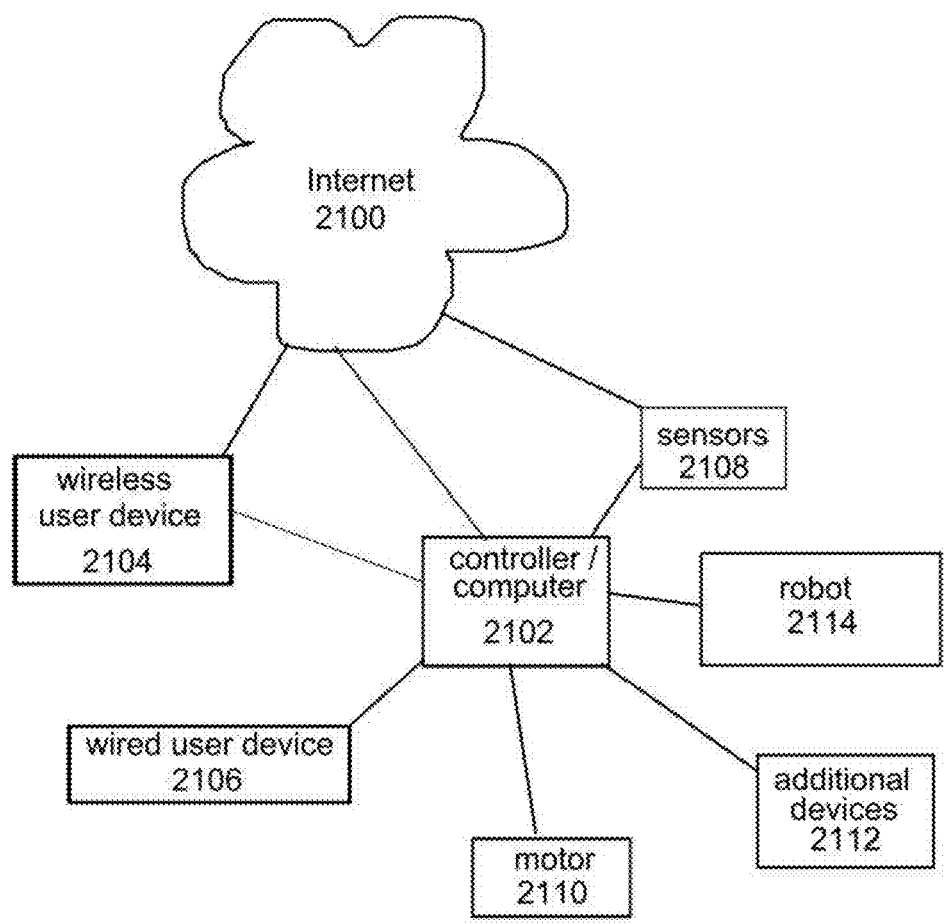
FIG. 21 is a control diagram in accordance with an embodiment of the invention.

FIG. 21 is a control diagram in accordance with an embodiment of the invention. Computer/controller 2102 may control motor 2110 and the automated shelves by way of an onboard motor controller. Controller may also contain one or more wireless communication capabilities such as Wi-Fi, Shure-Fi, ZigBee, Bluetooth, etc., for communicating with wireless sensors 2108 or wireless user device 2104 or with an Internet 2100 router. Wireless user device 2104 may communicate with controller 2104 directly through wireless communications or through the Internet 2100. Sensors 2108 may include proximity sensor, position sensors, heat sensor, humidity sensors, smoke sensors, and may be wired or wireless. Additional devices 2112 may include outlets which are inside of the automated shelves, other devices in the kitchen such as the refrigerators, stoves, microwaves, hot water tanks (under the sink), dishwashers, exhaust fans, etc. The computer/controller 2102 may sense smoke as an input from sensors 2108 and turn on an additional device exhaust fan 2112. The controller may keep an oven on for a given amount of time based on a recipe from the Internet 2100. The controller may alert a user as to the best way to cook or order to cook food for a large group based on the available resources of a consolidated computerized kitchen. The order and timing of cooking may be suggested so as to finish cooking a large meal with all of the food being done at the same time based on available appliances of a consolidated computerized kitchen. A user may control the consolidated computerized kitchen with a wired user control located on a wall of the kitchen. The wired or wireless controls may include an automated routine for locating and rotating automated shelves based on items on the shelves and a user's desired operation. For instance, a user may look up a recipe using the wired 2106 or wireless user device 2104 and computer/controller 2102 may inform the user if they have the correct ingredients to make the recipe. If the user has the correct ingredients and wants to make the food, the controller may automatically dictate the steps by rotating the automated shelves into a position with the correct first step and walk the user through making and cooking the food in a fast and efficient manner. The computer/controller 2102 may dictate in audio and/or video the steps a user should take in addition to automatically preheating an oven and locating measuring and cooking tools along with the ingredients needed. Robot 2114 may be controlled by computer 2102.

Figure 22:
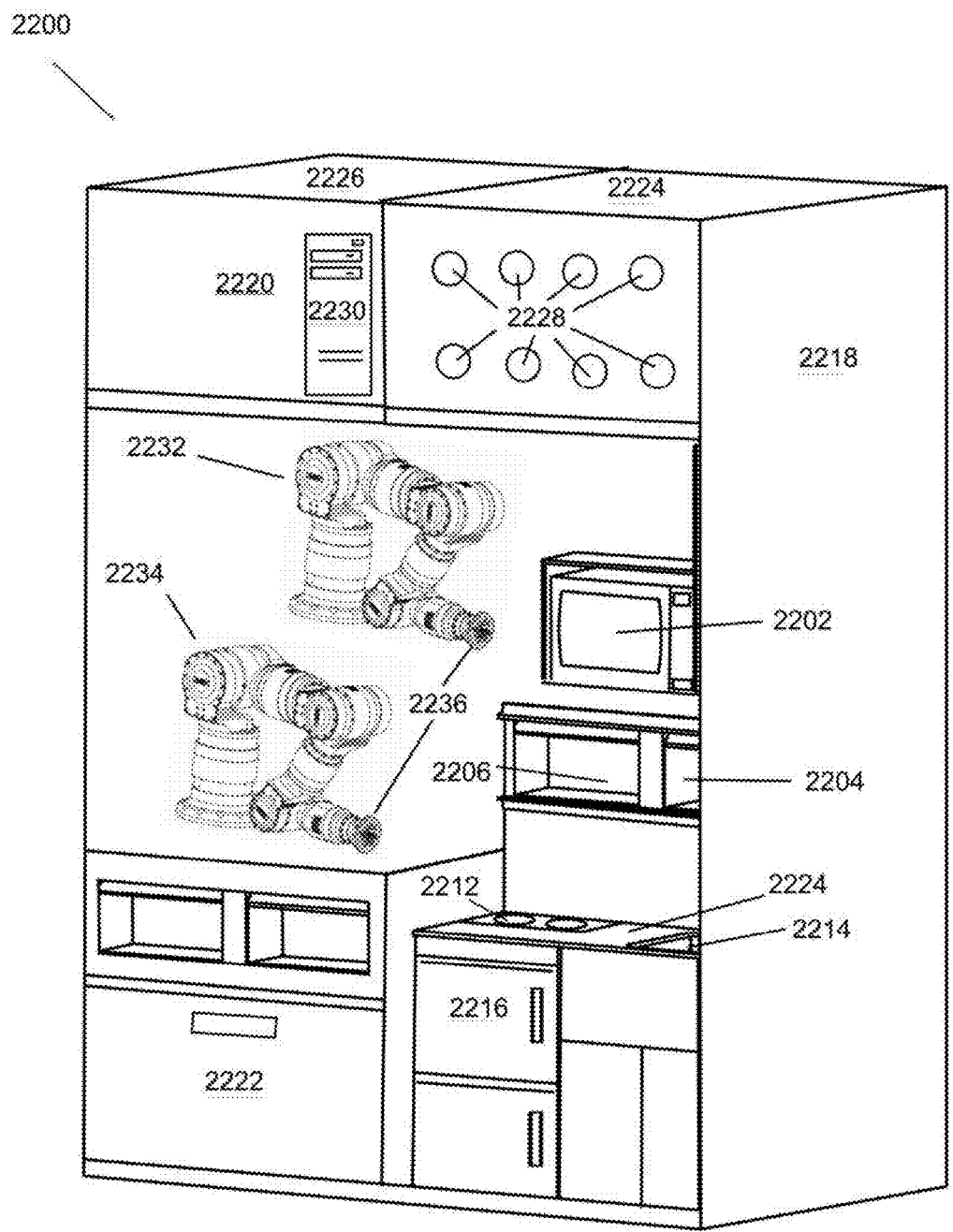
FIG. 22 is a perspective view of an automated kitchen in accordance with an embodiment of the invention.

FIG. 22 is a perspective view of a computerized kitchen workspace with one or more robots 2232 and 2234. Robots 2232 and 2234 may work in combination with each other to accomplish kitchen tasks. Kitchen tasks may be automated through computer control 2230 of the robots. The robots may preform loading and unloading of dishwasher 2222, cooking by means of cooktop 2212 or oven 2202, cleaning using sink 2214, and retrieval of stored items on automated shelves 2208, 2210, 2206, or 2204, etc. Kitchen items stored on automated shelves 2208, 2210, 2206, or 2204 may also be accessed and used by robots 2232 and 2234. Robots 2232 and 2234 may also have replaceable articulating hand members 2228. Hand members 2228 may be shaped and configured to allow the robot to electrically and physically control, move and use computerized kitchen workspace items. For example, a particular hand member may allow a robot to flip pancakes, or scoop ice cream from refrigerator/freezer 2216. One robot may hold the ice cream container while the other robot scoops the ice cream. Hand members 2228 may allow the robot to open and close drawers, ovens, refrigerators, cupboards, etc. Computer system 2230 may control one or more robots. Each robot may have a separate computer. Computer system 2230 may be connected to the Internet and/or networked together. Computer system 2230 may run automated control software which allows the computerized kitchen workspace to prepare meals, clean surfaces, clean dishes, put food away, etc. Robots 2232 and 2234 may have one or more vision systems for determining items for actuation or movement. The vision system may be connected to the robot arm allowing the robot see hand member connected to wrist 2236. The vision system may read barcodes or use optical character recognition on food containers to verify a correct ingredient in a recipe. The vision system may use barcodes or optical character recognition to map a food item to a location or position on a shelf of the automated shelves and store the location data in a local or remote database server. The vision system may also see a predetermined distance in front of a hand member which is attached to wrist 2236. Computer system 2230 may control the robots based on sensor inputs. The sensor inputs may include temperature sensors, oven timers, food temperatures, food cooking times, etc. Computer system 2230 may control automated shelves 2208, 2210, 2206 and 2204 such that robots 2232 and 2234 are able to each retrieve and/or store specific items in the automated shelves based on a recipe, or preprogramed software routine. Such a recipe or programmed software routine may be downloaded from the Internet.

A meal may be prepared automatically by a user sending a recipe to automated kitchen computer 2220 by way of the Internet or other network. The computer 2220 may then access an inventory of items stored on automated shelves and compare the necessary items to the recipe to determine if the meal can be prepared. If all of the necessary items are not present a text or email may be sent the user informing them of missing items. The computer may be programmed to automatically substitute food items when possible. The computer may also be programmed to suggest to a remote user recipes for which it has the ability to prepare based on inventory items in stock on the automated shelves. For example, computer system may send out an email or text at 4:00 pm to a user with a selection of possible dinner meals. A user may select a dinner meal by responding to a text or email or using a dedicated application on a user device. The automated kitchen may then prepare a meal according to a user's requested time and according to a selected meal or recipe. The meal may be timed to be hot and ready as the user arrives home from work.

The apparatus and methods disclosed herein may be embodied in other specific forms without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of preparing a meal comprising:
a non-transient computer program product implemented on a processor of a computer which automatically:
preheats one or more food cooking devices according to a recipe, the food cooking devices disposed within a rotating vertical module comprising a plurality of walls arranged in an alternating first and second plurality of adjacent box configurations comprising alternating first and second shelves respectively, the respective first plurality of alternating boxes and shelves being deeper than the respective second plurality of alternating boxes and shelves to allow passage around vertically opposed pulleys in the vertical module within the vertical module, such that the one or more food cooking devices and the plurality of the alternating first and second shelves are accessible by a user standing at a fixed position;
rotates the respective alternating first and second boxes and shelves to bring specific items for a recipe located on the alternating first and second shelves to the user;
moves one or more robot arms to access the specific items; and
directs the one or more robot arms to prepare the meal using the specific items and the one or more food cooking devices according to the recipe.

2. The method of claim 1, wherein the electrical power is supplied to at least some of the respective alternating first and second shelves.

3. The method of claim 1, further comprising a sink disposed within the vertical module.

4. The method of claim 1, wherein a kitchen appliance is electrically powered and operational while sitting on the respective alternating first and second shelves.

5. The method of claim 1, wherein one or more kitchen appliances are operational while sitting on the alternating first and second shelves while the alternating first and second shelves are rotating.

6. The method of claim 1, wherein the one or more robot arms prepare the meal using the specific items, the one or more food cooking devices, and the one or more kitchen appliances.

7. The method of claim 1, wherein the one or more food cooking devices include one or more of microwaves, stoves, ovens, ranges, convection ovens, or toaster ovens.

8. The method of claim 3, further comprising a cooktop device built into a counter top adjacent to the sink.

9. The method of claim 1, further comprising a refrigerator disposed within the vertical module in front of the alternating first and second shelves.

10. A computerized kitchen workspace comprising:
one or more food cooking devices disposed within a rotating vertical module comprising a plurality of walls arranged in an alternating first and second plurality of adjacent box configurations;
the alternating first and second plurality of adjacent box configurations comprising alternating first and second shelves respectively, the first plurality of the respective boxes and shelves being deeper than the second plurality of the respective alternating boxes and shelves to allow passage around vertically opposed pulleys in the vertical module and
the one or more food cooking devices are accessible by a user standing at a fixed position, each of the respective alternating first and second shelves being accessible at the fixed position by rotating the alternating first and second boxes and shelves to the fixed position;
one or more robot arms; and
a computer system, wherein the computer system controls the one or more robot arms to:
access specific items at the fixed position according to a recipe by rotating the respective alternating first and second boxes and shelves, and
prepare a meal using the specific items and the one or more food cooking devices in the computerized kitchen workspace according to the recipe.

11. The computerized kitchen workspace of claim 10, wherein electrical power is supplied to at least some of the plurality of the respective alternating first and second shelves.

12. The computerized kitchen workspace of claim 10, wherein the vertical module further comprises a cooktop.

13. The computerized kitchen workspace of claim 10, wherein one or more kitchen appliances are electrically powered and operational while sitting on one or more shelves of the alternating first and second shelves.

14. The computerized kitchen workspace of claim 10, wherein the computer system controls a cook time and cook temperature of the one or more food cooking devices according to the recipe.

15. The computerized kitchen workspace of claim 10, wherein more than one kitchen appliance is operational while sitting on one or more of the alternating first and second shelves while the respective shelves are rotating.

16. The computerized kitchen workspace of claim 10, wherein the one or more food cooking devices include one or more of microwaves, stoves, ovens, ranges, convection ovens or toaster ovens.

17. The computerized kitchen workspace of claim 10, wherein the vertical module further comprises a sink.

18. The computerized kitchen workspace of claim 10, the vertical module further comprising a refrigerator disposed in front of the alternating first and second shelves.

* * * * *